US011205282B2

United States Patent
Lin et al.

(10) Patent No.: US 11,205,282 B2
(45) Date of Patent: Dec. 21, 2021

(54) RELOCALIZATION METHOD AND APPARATUS IN CAMERA POSE TRACKING PROCESS AND STORAGE MEDIUM

(71) Applicant: Tencent Technology (Shenzhen) Company Limited, Shenzhen (CN)

(72) Inventors: Xiangkai Lin, Shenzhen (CN); Yonggen Ling, Shenzhen (CN); Linchao Bao, Shenzhen (CN); Wei Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 8 days.

(21) Appl. No.: 16/915,798

(22) Filed: Jun. 29, 2020

(65) Prior Publication Data

US 2020/0327694 A1 Oct. 15, 2020

Related U.S. Application Data

(63) Continuation of application No. PCT/CN2019/078928, filed on Mar. 20, 2019.

(30) Foreign Application Priority Data

Apr. 27, 2018 (CN) .......................... 201810391550.9

(51) Int. Cl.
*G06T 1/00* (2006.01)
*G06T 7/73* (2017.01)
(Continued)

(52) U.S. Cl.
CPC ............... *G06T 7/74* (2017.01); *G06F 17/16* (2013.01); *G06T 3/0006* (2013.01); *G06T 2207/20016* (2013.01); *G06T 2207/30244* (2013.01)

(58) Field of Classification Search
CPC ....... G06T 19/006; G06T 13/20; G06T 7/564; G06T 17/20; G06T 7/74; G06T 3/4007;
(Continued)

(56) References Cited

U.S. PATENT DOCUMENTS

| 10,860,683 B2 * | 12/2020 | Xu .......................... G06F 17/18 |
| 2016/0327395 A1 | 11/2016 | Roumeliotis et al. |
| 2017/0109930 A1 * | 4/2017 | Holzer .................... G06T 13/20 |

FOREIGN PATENT DOCUMENTS

| CN | 105953796 A | 9/2016 |
| CN | 106446815 A | 2/2017 |

(Continued)

OTHER PUBLICATIONS

Tencent Technology, WO, PCT/CN2019/078928, Jun. 20, 2019, 5 pgs.
Tencent Technology, IPRP, PCT/CN2019/078928, Oct. 27, 2020, 6 pgs.

(Continued)

*Primary Examiner* — Phuoc H Doan
(74) *Attorney, Agent, or Firm* — Morgan, Lewis & Bockius LLP

(57) ABSTRACT

This application discloses a repositioning method performed by an electronic device in a camera pose tracking process, belonging to the field of augmented reality (AR). The method includes: obtaining a current image acquired by the camera after an $i^{th}$ anchor image in a plurality of anchor images; obtaining an initial feature point and an initial pose parameter in a first anchor image in the plurality of anchor images in a case that the current image satisfies a repositioning condition; performing feature point tracking on the current image relative to the first anchor image, to obtain a target feature point; calculating a pose change amount of a camera from a first camera pose to a target camera pose according to the initial feature point and the target feature point; and performing repositioning according to the initial (Continued)

pose parameter and the pose change amount to obtain a target pose parameter.

20 Claims, 8 Drawing Sheets

(51) Int. Cl.
   *G06F 17/16* (2006.01)
   *G06T 3/00* (2006.01)
(58) Field of Classification Search
   CPC ..... G06T 7/50; G06T 3/0006; G06K 9/00798; G06K 9/6232; G01C 21/32; H04N 5/2253; G07T 7/248; G06F 17/18; G06N 3/08
   See application file for complete search history.

(56) References Cited

FOREIGN PATENT DOCUMENTS

| | | |
|---|---|---|
| CN | 106885574 A | 6/2017 |
| CN | 106996769 A | 8/2017 |
| CN | 107193279 A | 9/2017 |
| CN | 107808395 A | 3/2018 |
| CN | 107888828 A | 4/2018 |
| CN | 108615248 A | 10/2018 |
| CN | 108648235 A | 10/2018 |
| WO | WO 2011048497 A2 | 4/2011 |

OTHER PUBLICATIONS

Tencent Technology, ISR, PCT/CN2019/078928, Jun. 20, 2019, 2 pgs.

* cited by examiner

RELOCALIZATION METHOD AND APPARATUS IN CAMERA POSE TRACKING PROCESS AND STORAGE MEDIUM

CROSS REFERENCE TO RELATED APPLICATIONS

This application is a continuation application of PCT Patent Application No. PCT/CN2019/078928, entitled "METHOD AND DEVICE FOR REPOSITIONING IN CAMERA ORIENTATION TRACKING PROCESS, AND STORAGE MEDIUM" filed on Mar. 20, 2019, which claims priority to Chinese Patent Application No. 201810391550.9, entitled "REPOSITIONING METHOD AND APPARATUS IN CAMERA POSE TRACKING PROCESS, DEVICE, AND STORAGE MEDIUM" filed Apr. 27, 2018, all of which are incorporated by reference in their entirety.

This application is related to U.S. application Ser. No. 16/900,634, entitled "REPOSITIONING METHOD AND APPARATUS IN CAMERA POSE TRACKING PROCESS, DEVICE, AND STORAGE MEDIUM" filed on Jun. 12, 2020, which is incorporated by reference in its entirety.

This application is related to U.S. application Ser. No. 16,915,825, entitled "RELOCALIZATION METHOD AND APPARATUS IN CAMERA POSE TRACKING PROCESS, DEVICE, AND STORAGE MEDIUM" filed on Jun. 29, 2020, which is incorporated by reference in its entirety.

FIELD OF THE TECHNOLOGY

Embodiments of this application relate to the field of augmented reality (AR), and in particular, to a repositioning method and apparatus in a camera pose tracking process and a storage medium.

BACKGROUND OF THE DISCLOSURE

Visual simultaneous localization and mapping (SLAM) is a technology in which a subject equipped with a camera establishes a model of an environment during movement without priori information of the environment and at the same time estimates the movement thereof. The SLAM is applicable to the field of AR, the field of robots, and the field of autopilot.

Monocular vision SLAM is used as an example. The first frame of image acquired by a camera is usually used as an anchor image. In a case that the camera subsequently acquires a current image, a device tracks a common feature point between the current image and the anchor image, and performs calculation according to a position change of the feature point between the current image and the anchor image to obtain a pose change of the camera in the real world. However, in some scenarios, a feature point in the current image may be lost and can no longer be tracked. In this case, an SLAM repositioning method needs to be used to perform repositioning in the current image.

SUMMARY

Embodiments of this application provide a repositioning method and apparatus in a camera pose tracking process and a storage medium. The technical solutions are as follows:

According to an aspect of the embodiments of this application, a repositioning method in a camera pose tracking process is provided, applied to a device having a camera, the device being configured to sequentially perform camera pose tracking on a plurality of anchor images, the method including:

obtaining a current image acquired by the camera after an $i^{th}$ anchor image in the plurality of anchor images, i being an integer greater than 1;

obtaining an initial feature point and an initial pose parameter in a first anchor image in the plurality of anchor images in a case that the current image satisfies a repositioning condition, the initial pose parameter being used to indicate a camera pose of the camera during acquisition of the first anchor image;

performing feature point tracking on the current image relative to the first anchor image, to obtain a target feature point matching the initial feature point;

calculating a pose change amount of the camera from a first camera pose to a target camera pose according to the initial feature point and the target feature point, the target camera pose being a camera pose of the camera during acquisition of the current image; and performing repositioning according to the initial pose parameter and the pose change amount to obtain a target pose parameter corresponding to the target camera pose.

According to another aspect of the embodiments of this application, a repositioning apparatus in a camera pose tracking process is provided, configured to sequentially perform camera pose tracking on a plurality of anchor images, the apparatus including:

an image obtaining module, configured to obtain a current image acquired after an $i^{th}$ anchor image in the plurality of anchor images, i being an integer greater than 1;

an information obtaining module, configured to obtain an initial feature point and an initial pose parameter in the first anchor image in the plurality of anchor images in a case that the current image satisfies a repositioning condition, the initial pose parameter being used to indicate a camera pose of a camera during acquisition of the first anchor image;

a feature point tracking module, configured to perform feature point tracking on the current image relative to the first anchor image, to obtain a target feature point matching the initial feature point;

a change amount calculation module, configured to calculate a pose change amount of the camera from a first camera pose to a target camera pose according to the initial feature point and the target feature point, the target camera pose being a camera pose of the camera during acquisition of the current image; and a repositioning module, configured to perform repositioning according to the initial pose parameter and the pose change amount to obtain a target pose parameter corresponding to the target camera pose.

According to another aspect of the embodiments of this application, an electronic device is provided, the electronic device including a memory, a camera and a processor, the memory storing at least one instruction, the at least one instruction being loaded and executed by the processor to implement the foregoing repositioning method in a camera pose tracking process.

According to another aspect of the embodiments of this application, a non-transitory computer-readable storage medium is provided, storing at least one instruction, the at least one instruction being loaded and executed by a processor of an electronic device having a camera to implement the foregoing repositioning method in a camera pose tracking process.

The beneficial effects produced by the technical solutions provided in the embodiments of this application at least include:

Repositioning is performed on a current image and the first anchor image in a case that the current image satisfies a repositioning condition, repositioning can be implemented in an anchor-SLAM algorithm for tracking a plurality of consecutive anchor images, and a tracking process is less prone to interruption. Because repositioning is performed on the current image relative to the first anchor image in a repositioning process, an accumulated error generated in a tracking process of a plurality of anchor images can further be eliminated, thereby resolving a problem that an SLAM repositioning method in the related art has a relatively poor repositioning effect in the field of AR.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make objectives, technical solutions, and advantages of this application clearer, the following further describes in detail implementations of this application with reference to the accompanying drawings.

Several nouns used in this application are briefly described first:

AR is a technology that as a camera acquires an image, a camera pose parameter of the camera in the real world (or referred to as the three-dimensional world or the actual world) is calculated in real time, and a virtual element is added according to the camera pose parameter to the image acquired by the camera. The virtual element includes, but is not limited to, an image, a video, and a three-dimensional model. The objective of the AR technology is to overlay the virtual world on a screen onto the real world to perform interaction. The camera pose parameter includes a displacement vector and a rotation matrix. The displacement vector is used to represent a displacement distance of the camera in the real world. The rotation matrix is used to represent a rotation angle of the camera in the real world.

Figure 1:
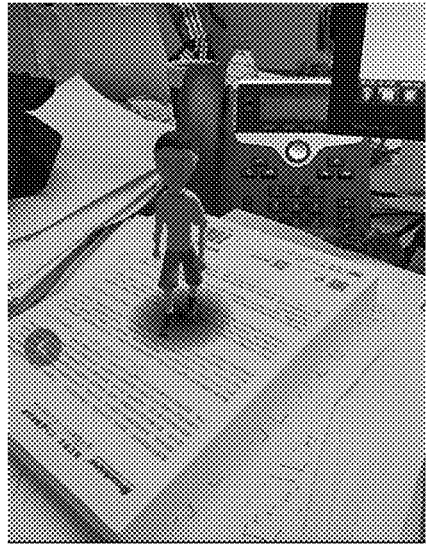
FIG. 1 is a schematic scenario diagram of an AR application scenario according to an exemplary embodiment of this application.
Figure 2:
FIG. 2 is a schematic scenario diagram of an AR application scenario according to an exemplary embodiment of this application.

For example, referring to FIG. 1 and FIG. 2, a device adds a figure of a virtual human to an image photographed by the camera. As the camera moves in the real world, the image photographed by the camera changes, and a photographing position of the virtual human also changes, thereby simulating an effect that the virtual human is still in the image and the camera photographs the image and the virtual human while the position and pose are changing, so as to present a realistic three-dimensional picture to a user.

Optionally, the camera disposed in the device in this application is a monocular camera.

An anchor-switching AR system is an AR system that determines a camera pose parameter in a natural scene based on camera pose tracking of a plurality of consecutive anchor images and overlays the virtual world according to the camera pose parameter onto an image acquired by the camera.

An inertial measurement unit (IMU) is an apparatus configured to measure tri-axial attitude angles (or angular velocities) and accelerations of an object. Generally, the IMU includes three uniaxial accelerometers and three uniaxial gyroscopes. The accelerometer is configured to detect an acceleration signal of an object on each coordinate axis of a three-dimensional coordinate system, to calculate the displacement vector. The gyroscopes are configured to detect a rotation matrix of the object in the three-dimensional coordinate system. Optionally, the IMU includes a gyroscope, an accelerometer, and a geomagnetic sensor.

Schematically, a manner of establishing a three-dimensional coordinate system is as follows: 1. The X axis is defined by a vector product Y*Z, and a direction tangential to the ground at a current position of the device on the X axis points to the east. 2. A direction tangential to the ground at the current position of the device on the Y axis points to the north pole of the geomagnetic field. 3. The Z axis points to the sky and is perpendicular to the ground.

During camera pose tracking in the field of AR, for example, in a scenario of using a mobile phone to photograph a desktop to play an AR game, due to a special use scenario of AR, a fixed plane (for example, a desktop or a wall surface) in the real world is usually continuously photographed, the effect of directly using an SLAM repositioning method in the related art is relatively poor, and it is still necessary to provide a repositioning solution applicable to the field of AR.

Figure 3:
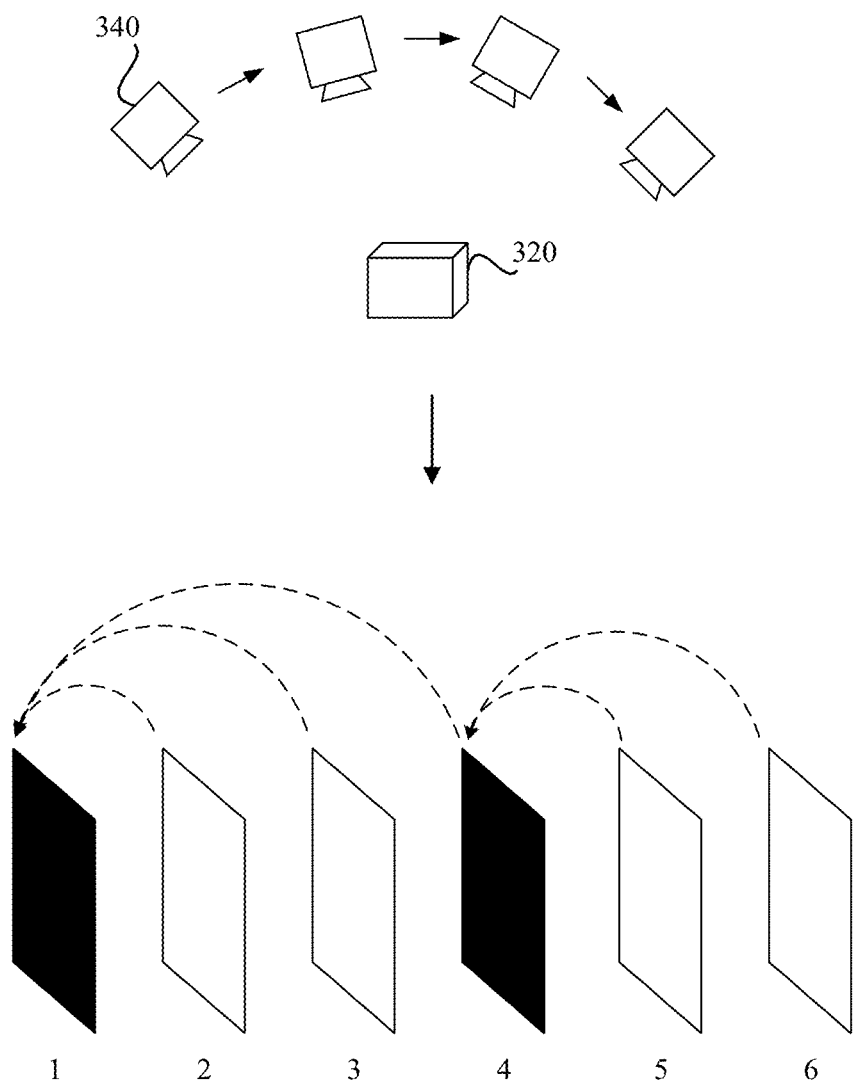
FIG. 3 is a schematic diagram of the principle of an anchor-switching AR system algorithm according to an exemplary embodiment of this application.

This application provides a repositioning method applicable to an anchor-switching AR system algorithm. In the anchor-switching AR system algorithm, in a process of determining a camera pose, a movement process of a camera is divided into at least two tracking processes to perform tracking, and each tracking process corresponds to a respective anchor image. Schematically, in a tracking process corresponding to an $i^{th}$ anchor image, in a case that a tracking effect of a current image relative to the $i^{th}$ anchor image is poorer than a preset condition (for example, a quantity of feature points that can be obtained through matching is less than a preset threshold), a previous image of the current image is determined as an $(i+1)^{th}$ anchor image, and an $(i+1)^{th}$ tracking process is started, i being a positive integer. Schematically, FIG. 3 is a schematic diagram of the principle of the anchor-switching AR system algorithm according to an exemplary embodiment of this application. An object 320 exists in the real world, a device 340 provided with a camera is held by a user to move, and a plurality of frames of image 1 to 6 including the object 320 are photographed during movement. The device determines the image 1 as the first anchor image (born-anchor or born-image) and records an initial camera pose parameter. The initial camera pose parameter may be acquired by an IMU. Feature point tracking is then performed on the image 2 relative to the image 1, and a camera pose parameter of the camera during the photographing of the image 2 is calculated according to the initial camera pose parameter and a feature point tracking result. Feature point tracking is performed on the image 3 relative to the image 1, and a camera pose parameter of the camera during the photographing of the image 3 is calculated according to the initial camera pose parameter and a feature point tracking result. Feature point tracking is performed on the image 4 relative to the image 1, and a camera pose parameter of the camera during the photographing of the image 4 is calculated according to the initial camera pose parameter and a feature point tracking result.

Feature point tracking is then performed on the image 5 relative to the image 1. The image 4 is determined as the second anchor image in a case that the effect of feature point tracking is poorer than a preset condition (for example, there is a relatively small quantity of matching feature points). Feature point tracking is performed on the image 5 relative to the image 4, and a displacement change amount of the camera during the photographing of the image 4 and the photographing of the image 5 is calculated. A displacement change amount of the camera between the photographing of the image 4 and the photographing of the image 1 and the initial camera pose parameter are then combined to calculate a camera pose parameter of the camera during the photographing of the image 5. Feature point tracking is then performed on the image 6 relative to the image 4. The rest is deduced by analogy. A previous frame of image of the current image may be determined as a new anchor image in a case that the effect of feature point tracking of the current image deteriorates, and feature point tracking is performed again after switching to the new anchor image.

Optionally, an algorithm based on a visual odometry principle such as optical flow tracking and a direct method may be used for feature point tracking. In various abnormal scenarios such as that the camera moves relatively intensely, moves toward an intense light source, and moves toward a white wall in a tracking process, a loss phenomenon may occur in the foregoing tracking process of an anchor-switching AR system. The loss phenomenon means that sufficient feature points cannot be obtained from a current image through matching, resulting in a tracking failure.

Figure 4:
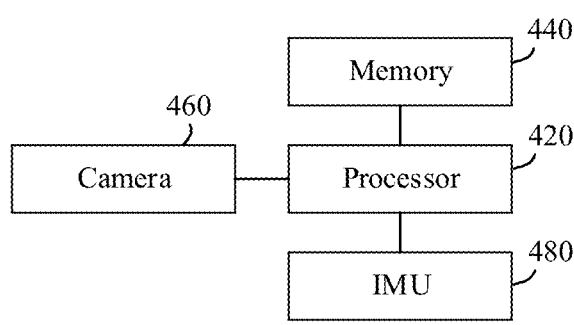
FIG. 4 is a structural block diagram of an electronic device according to an exemplary embodiment of this application.

FIG. 4 is a structural block diagram of an electronic device according to an exemplary embodiment of this application. The device includes a processor 420, a memory 440, a camera 460, and an IMU 480.

The processor 420 includes one or more processing cores, for example, a 4-core processor, an 8-core processor, and the like. The processor 420 is configured to execute at least one of an instruction, a code, a code segment, and a program stored in the memory 440.

The processor 420 is electrically connected to the memory 440. Optionally, the processor 420 is connected to the memory 440 by a bus. The memory 440 stores one or more instructions, codes, code segments and/or programs. The instruction, code, code segment and/or program is executed by the processor 420 to implement an SLAM repositioning method provided in the following embodiments.

The processor 420 is further electrically connected to the camera 460. Optionally, the processor 420 is connected to the camera 460 by a bus. The camera 460 is a sensing device having an image acquisition capability. The camera 460 may also be referred to as a photosensitive device, among other names. The camera 460 has a capability of consecutively acquiring images or repeatedly acquiring images. Optionally, the camera 460 is disposed inside or outside the device. Optionally, the camera 460 is a monocular camera.

The processor 420 is further electrically connected to the IMU 480. Optionally, the IMU 480 is configured to: acquire a pose parameter of the camera at an interval of a predetermined time, and record a time stamp of each group of pose parameters during acquisition. The pose parameter of the camera includes a displacement vector and a rotation matrix. The rotation matrix acquired by the IMU 480 is relatively accurate, and the acquired displacement vector may have a relatively large error due to an actual environment.

Figure 5:
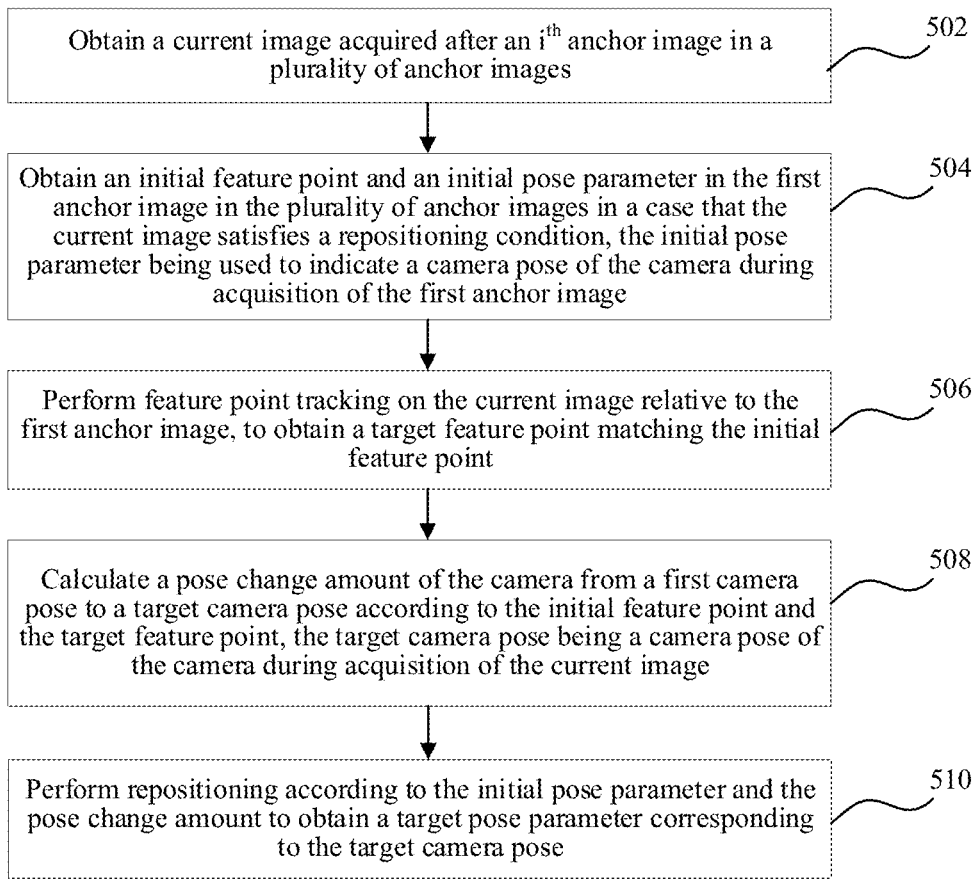
FIG. 5 is a flowchart of a repositioning method in a camera pose tracking process according to an exemplary embodiment of this application.

FIG. 5 is a flowchart of a repositioning method in a camera pose tracking process according to an exemplary embodiment of this application. This embodiment is described by using an example in which the repositioning method is applied to the device shown in FIG. 4. The device is configured to sequentially perform camera pose tracking on a plurality of anchor images. The method includes the following steps:

Step 502: Obtain a current image acquired after an $i^{th}$ anchor image in the plurality of anchor images.

A camera in the device acquires frames of image at an interval of a preset time to form an image sequence. Optionally, the camera acquires frames of image at an interval of a preset time in a movement (translation and/or rotation) process to form an image sequence.

Optionally, the device determines the first frame of image in the image sequence (or one frame of image satisfying a predetermined condition in several frames of image in the front) as the first anchor image, performs feature point tracking on a subsequently acquired image relative to the first anchor image, and calculates a camera pose parameter of the camera according to a feature point tracking result. In a case that the effect of feature point tracking of a current frame of image is poorer than a preset condition, a previous frame of image of the current frame of image is determined as the second anchor image, feature point tracking is performed on a subsequently acquired image relative to the second anchor image, and the camera pose parameter of the camera is calculated according to a feature point tracking result. The rest is deduced by analogy. The device may sequentially perform camera pose tracking on a plurality of consecutive anchor images.

During an $i^{th}$ tracking process corresponding to the $i^{th}$ anchor image, the camera acquires a current image. The current image is a frame of image acquired after the $i^{th}$ anchor image, i being an integer greater than 1.

The current image is an image that is being processed currently, but is not necessarily an image acquired at a current moment.

Step 504: Obtain an initial feature point and an initial pose parameter in the first anchor image in the plurality of anchor images in a case that the current image satisfies a repositioning condition, the initial pose parameter being used to indicate a camera pose of the camera during acquisition of the first anchor image.

The device determines whether the current image satisfies the repositioning condition. The repositioning condition is used to indicate that a tracking process of the current image relative to the $i^{th}$ anchor image fails, or, the repositioning condition is used to indicate that an accumulated error in historical tracking processes is already greater than the preset condition.

In an optional embodiment, the device tracks the current image relative to the $i^{th}$ anchor image, and determines that a tracking process of the current image relative to the $i^{th}$ anchor image fails, and the current image satisfies the repositioning condition in a case that a feature point matching the $i^{th}$ anchor image does not exist in the current image or a quantity of feature points in the current image that match the $i^{th}$ anchor image is less than a first quantity.

In another optional embodiment, the device determines that an accumulated error in historical tracking processes is already greater than the preset condition in a case that the device determines that a quantity of frames between the current image and an image in previous repositioning is greater than a second quantity, or the device determines that an accumulated error in historical tracking processes is already greater than the preset condition in a case that the device determines that a quantity of anchor images between the $i^{th}$ anchor image and the first anchor image is greater than a third quantity.

Specific condition content of the repositioning condition is not limited in this embodiment.

The device attempts to perform feature point tracking on the current image relative to the first anchor image in a case that the current image satisfies the repositioning condition. In this case, the device obtains a cached initial feature point and initial pose parameter in the first anchor image, and the initial pose parameter is used to indicate the camera pose of the camera during acquisition of the first anchor image.

The initial feature point is a feature point extracted from the first anchor image. There may be a plurality of initial feature points, for example, 10 to 500 initial feature points. The initial pose parameter is used to indicate the camera pose of the camera during acquisition of the first anchor image. Optionally, the initial pose parameter includes a rotation matrix R and a displacement vector T. The initial pose parameter may be acquired by an IMU.

Step 506: Perform feature point tracking on the current image relative to the first anchor image, to obtain a target feature point matching the initial feature point.

A tracking algorithm based on visual odometry may be used for feature point tracking. This is not limited in this application. In an embodiment, a Kanade-Lucas (KLT) optical flow tracking algorithm is used for feature point tracking. In another embodiment, for feature point tracking, an oriented FAST and rotated BRIEF (ORB, fast feature point extraction and description) feature descriptor extracted based on an ORB algorithm is used to perform feature point tracking. In this application, a specific algorithm for feature point tracking is not limited, and a feature point method or a direct method may be used for a feature point tracking process.

In an embodiment, the device performs feature point extraction on the first anchor image, to obtain N initial feature points. The device further performs feature point extraction on the current image, to obtain M candidate feature points. The device then matches the M candidate feature points one by one against the N initial feature points, to determine at least one matching feature point pair. Each matching feature point pair includes an initial feature point and a target feature point. The initial feature point is a feature point in the first anchor image, and the target feature point is a candidate feature point that is in the current image and has the highest matching degree with an $i^{th}$ initial feature point.

Optionally, a quantity of initial feature points is greater than or equal to a quantity of target feature points. For example, there are 450 initial feature points, and there are 320 target feature points.

Step 508: Calculate a pose change amount of the camera from a first camera pose to a target camera pose according to the initial feature point and the target feature point, the target camera pose being a camera pose of the camera during acquisition of the current image.

Optionally, the device calculates a homography matrix between two frames of image according to the initial feature point and the target feature point; and decomposes the homography matrix to obtain the pose change amount including $R_{relocalize}$ and $T_{relocalize}$ of the change of the camera from the first camera pose to the target camera pose.

The homography matrix describes a mapping relationship between two planes. The homography matrix may be used to perform movement estimation in a case that feature points in the natural scenario (the real environment) all fall in a same physical plane. The device uses RANdom SAmple Consensus (RANSAC) to decompose the homography matrix in a case that there are at least four pairs of matching initial feature points and target feature points, to obtain a rotation matrix $R_{relocalize}$ and a translation vector $T_{relocalize}$.

$R_{relocalize}$ is the rotation matrix of the change of the camera from the first camera pose to the target camera pose, and $T_{relocalize}$ is a displacement vector of the change of the camera from the first camera pose to the target camera pose.

Step 510: Perform repositioning according to the initial pose parameter and the pose change amount to obtain a target pose parameter corresponding to the target camera pose.

After performing conversion on the initial pose parameter by using the pose change amount, the device performs repositioning to obtain the target pose parameter corresponding to the target camera pose, so as to calculate the camera pose of the camera during acquisition of the current image.

Optionally, in a case that repositioning of the current image succeeds, the terminal determines the current image as an $(i+1)^{th}$ anchor image.

The terminal continues to perform feature point tracking based on the $(i+1)^{th}$ anchor image. The terminal may further continue to generate an $(i+2)^{th}$ anchor image, an $(i+3)^{th}$ anchor image, an $(i+4)^{th}$ anchor image, and the like according to subsequent feature point tracking. The rest is deduced by analogy. Details are not described herein again. For a related process, reference may be made to the foregoing tracking content shown in FIG. 3.

In conclusion, in the repositioning method provided in this embodiment, repositioning is performed on a current image and the first anchor image in a case that the current image satisfies a repositioning condition, repositioning can be implemented in an anchor-SLAM algorithm for tracking a plurality of consecutive anchor images, and a tracking process is less prone to interruption, thereby resolving a problem that an SLAM repositioning method in the related art has a relatively poor repositioning effect in the field of AR.

In addition, because repositioning is performed on the current image relative to the first anchor image in a repositioning process, it may be considered that the first anchor image has no accumulated error. Therefore, in this embodiment, an accumulated error generated in a tracking process of a plurality of anchor images can further be eliminated.

Several stages of the foregoing repositioning method are described below.

Preprocessing Stage

Figure 6:
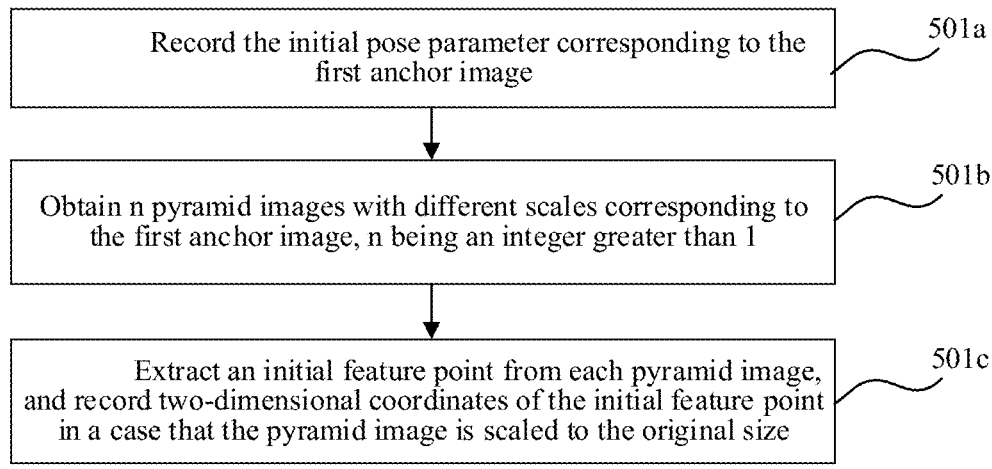
FIG. 6 is a flowchart of a repositioning method in a camera pose tracking process according to an exemplary embodiment of this application.

In an optional embodiment shown in FIG. 5, because the first anchor image is usually the first frame of image photographed by the camera and is also a current image used in a repositioning process, to increase the success rate of feature point matching, the first anchor image needs to be preprocessed. As shown in FIG. 6, before step 502, the method further includes the following steps:

Step 501a: Record the initial pose parameter corresponding to the first anchor image.

An IMU is disposed in the device, and the IMU periodically acquires a pose parameter of the camera and a time stamp. The pose parameter includes a rotation matrix and a displacement vector, and the time stamp is used to represent an acquisition time of the pose parameter. Optionally, the rotation matrix acquired by the IMU is relatively accurate.

As soon as the camera in the device acquires each frame of image, a photographing time of the frame of image is simultaneously recorded. The device searches for and records the initial pose parameter of the camera during the photographing of the first anchor image according to a photographing time of the first anchor image.

Step 501b: Obtain n pyramid images with different scales corresponding to the first anchor image, n being an integer greater than 1.

The device further extracts an initial feature point from the first anchor image. Optionally, a feature extraction algorithm used by the device to extract a feature point may be a features from accelerated segment test (FAST) detection algorithm, a Shi-Tomasi corner detection algorithm, a Harris corner detection algorithm, a scale-invariant feature transform (SIFT) algorithm, an ORB (fast feature point extraction and description) algorithm or the like.

Because it is relatively difficult to calculate a SIFT feature in real time, to ensure real-time performance, the device may extract an ORB feature point from the first anchor image. One ORB feature point includes one FAST corner (keypoint) and one binary robust independent elementary feature (BRIER) descriptor.

The FAST corner is the position of the ORB feature point in the image. The FAST corner mainly detects the position of a local pixel with obviously changing grayscale and is well known for high speed. The concept of the FAST corner is that in a case that a pixel is distinctly different from a pixel in a neighboring area (is excessively bright or excessively dark), the pixel may be a corner.

The BRIEF descriptor is a binary vector. The vector describes information about pixels around the key point in a manual design manner. A description vector of the BRIEF descriptor is formed by a plurality of 0s and 1s. The 0s and 1s herein have encoded a value relationship between two pixels near the FAST corner.

It is relatively fast to calculate an ORB feature, which is therefore suitable for implementation on a mobile device. However, because an ORB feature descriptor does not have scale-invariance, and a scale change amount is obvious in a case that a user holds the camera to acquire an image, the user may very likely observe a picture corresponding to the first anchor image in a very far or very near scale. In an optional implementation, the device generates the n pyramid images with different scales for the first anchor image.

The pyramid image is an image obtained after the first anchor image is scaled according to a preset ratio. For example, the pyramid image includes four layers of image. The first anchor image is scaled according to scaling ratios 1.0, 0.8, 0.6, and 0.4, to obtain four images with different scales.

Step 501c: Extract an initial feature point from each pyramid image, and record two-dimensional coordinates of the initial feature point in a case that the pyramid image is scaled to the original size.

The device extracts a feature point from each layer of the pyramid image and calculates an ORB feature descriptor. For a feature point extracted from the pyramid image that is not in the original scale (1.0), after the pyramid image is scaled up to the original scale according to a scaling ratio, two-dimensional coordinates of each feature point in the pyramid image in the original scale are recorded. These feature points and two-dimensional coordinates in the pyramid image may be referred to as layer-key points. In an example, there are 500 at most feature points in each layer of the pyramid image.

For the first anchor image, a feature point in each pyramid image is determined as an initial feature point. In a subsequent feature point tracking process, high-frequency details in the current image are all clearly visible in a case that a current image is in a very large scale, so that the current image and a relatively low layer of the pyramid image (for example, the original image) have a higher matching score. Conversely, only blurry low-frequency information can be seen in the current image in a case that a current image is in a very small scale, so that the current image and a relatively high layer of the pyramid image have a higher matching score.

Figure 7:
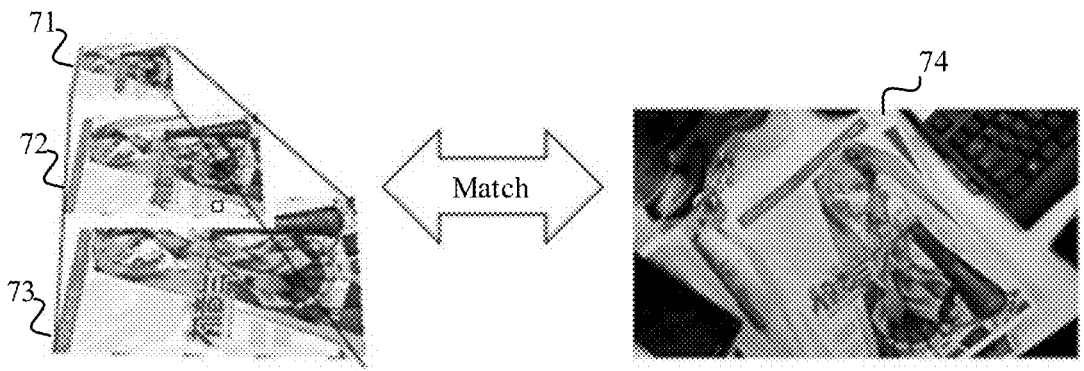
FIG. 7 is a schematic diagram of a pyramid image according to an exemplary embodiment of this application.

In the example shown in FIG. 7, the first anchor image has three pyramid images 71, 72, and 73. The pyramid image 71 is located at the first layer of the pyramid and is one of the three images that is in the smallest scale. The pyramid image 72 is located at the second layer of the pyramid and is one of the three images that is in the middle scale. The pyramid image 73 is located at the third layer of the pyramid and is one of the three images that has the largest scale. In a case that feature point tracking is performed on a current image 74 relative to the first anchor image, the device may respectively match the current image 74 against feature points extracted from the three pyramid images. Because the pyramid image 73 and the current image 74 have closer scales, feature points extracted from the pyramid image 73 have a higher matching score.

In this embodiment, pyramid images with a plurality of scales are set for the first anchor image, and an initial feature point in each layer of the pyramid image is further extracted and used for a subsequent feature point tracking process. By means of joint matching of feature points in a plurality of scales, the scale of the first anchor image is automatically adjusted, thereby implementing scale-invariance.

Feature Point Tracking Stage

In an optional embodiment shown in FIG. 5, for the feature point tracking process shown in step 506, the device extracts a feature point from a current image, and the feature point may be an ORB feature descriptor. Different from the extraction of a plurality of layers of feature points from the first anchor image, the device may extract one layer of feature points (for example, 500 at most) from the current image. Layer-key points extracted in advance from the first anchor image and feature points extracted from the current image are matched by using an ORB feature descriptor.

Figure 8:
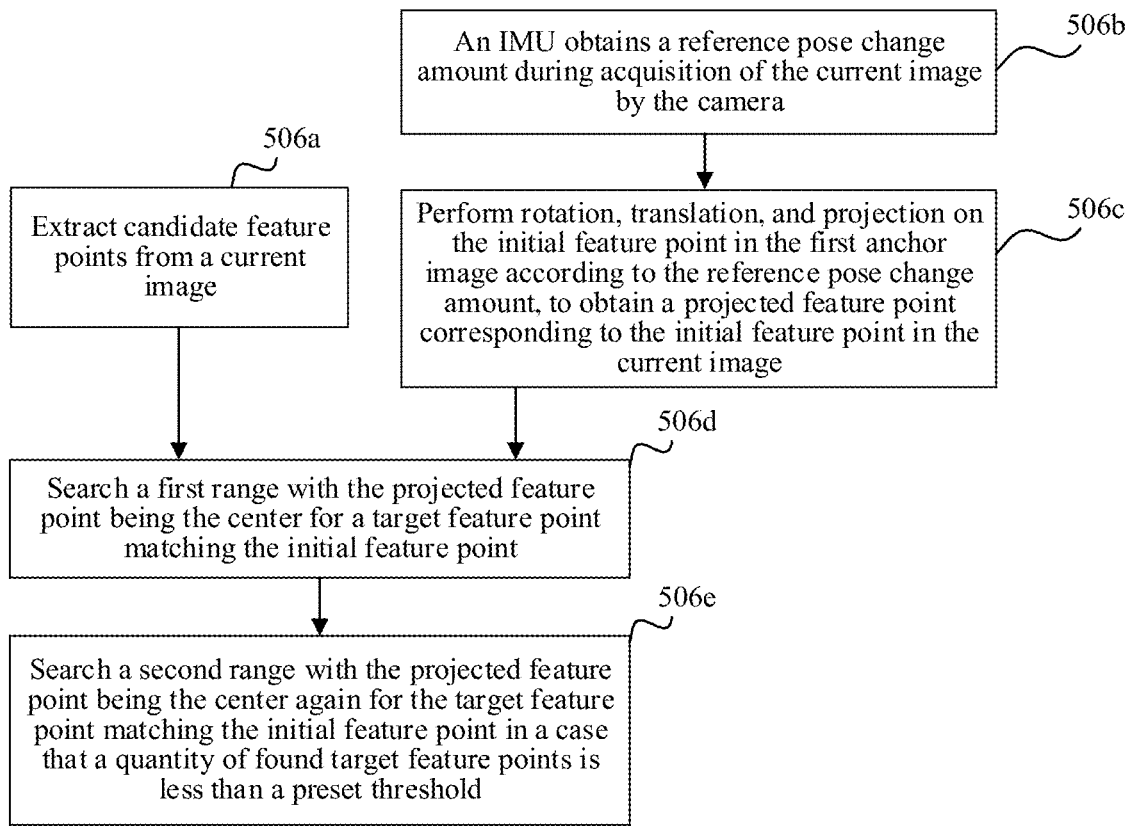
FIG. 8 is a flowchart of a repositioning method in a camera pose tracking process according to an exemplary embodiment of this application.

To increase a matching speed, in this embodiment of this application, matching is further accelerated in the feature point tracking process. As shown in FIG. 8, step 506 optionally includes the following sub-steps 506a to 506c:

Step 506a: Extract candidate feature points from a current image.

A feature extraction algorithm used by the device to extract a feature point may be at least one of a FAST detection algorithm, a Shi-Tomasi corner detection algorithm, a Harris corner detection algorithm, a SIFT algorithm, and an ORB algorithm. This embodiment is described by using an example of using an ORB algorithm to extract an ORB feature descriptor in a current image.

Step 506b: The IMU obtains a reference pose change amount during acquisition of the current image by the camera.

The IMU is disposed in the device, and the IMU can obtain the reference pose change amount during acquisition of the current image by the camera. The reference pose change amount is used to represent a pose change amount of the camera in a process from acquisition of the first anchor image to acquisition of the current image. The pose change amount includes a rotation matrix and a displacement vector. Because of physical features of the IMU, the rotation matrix acquired by the IMU is relatively accurate, and the displacement vector acquired by the IMU has a particular accumulated error but still approximates to an actual result to be still significant.

Step 506c: Perform rotation, translation, and projection on the initial feature point in the first anchor image according to the reference pose change amount, to obtain a projected feature point corresponding to the initial feature point in the current image.

In an exemplary example, this step includes the following sub-steps:

1: Obtain two-dimensional coordinates of the initial feature point in the first anchor image.

The device extracts and caches the two-dimensional coordinates of the initial feature point in the first anchor image in advance. The two-dimensional coordinates are homogeneously represented.

2. Perform back projection on the two-dimensional coordinates of the initial feature point, to obtain first three-dimensional coordinates $X_{born}$ of the initial feature point in the three-dimensional space.

The device converts the two-dimensional coordinates of the initial feature point into three-dimensional space by using the following formula, to obtain the first three-dimensional coordinates $X_{born}$ of the initial feature point in the three-dimensional space.

$$X_{born} = d * \begin{bmatrix} \frac{1}{fx} & 0 & -\frac{cx}{fx} \\ 0 & \frac{1}{fy} & -\frac{cy}{fy} \\ 0 & 0 & 1 \end{bmatrix} * x_{born},$$

where $f_x$, $f_y$, $c_x$, and $c_y$ are built-in parameters of the camera. The two-dimensional coordinates $x_{born}$ of the initial feature point are a homogeneous representation of layer-key points in the first anchor image, and the three-dimensional point $X_{born}$ is a non-homogeneous representation. It is assumed that an initial depth d of the first anchor image is 1.

3. Perform three-dimensional rotation and translation on the first three-dimensional coordinates $X_{born}$ by using the following formula, to obtain second three-dimensional coordinates $X_{current}$ corresponding to the initial feature point in the current image, $$X_{current} = R * X_{born} + T,$$

where R is the rotation matrix in the reference pose change amount acquired by the IMU, and T is the displacement vector in the reference pose change amount acquired by the IMU.

4. Project the second three-dimensional coordinates $X_{current}$ onto the current image, to obtain two-dimensional coordinates of the projected feature point in the current image.

The device projects the second three-dimensional coordinates $X_{current}$ onto the current image by using the following formula, to obtain two-dimensional coordinates $X_{current}$ of the projected feature point in the current image:

$$x_{current} = \begin{bmatrix} fx & 0 & cx \\ 0 & fy & cy \\ 0 & 0 & 1 \end{bmatrix} * X_{current},$$

where $f_x$, $f_y$, $c_x$, and $c_y$ are built-in parameters of the camera.

The positions of these projected feature points in the current image are used to predict the position of a target feature point. The positions of these projected feature points are usually the same as or close to the position of the target feature point.

Step 506d: Search a first range with the projected feature point being the center for a target feature point matching the initial feature point.

The device extracts a plurality of ORB feature descriptors from the current image. For a projected feature point corresponding to each initial feature point, candidate ORB feature descriptors located in the first range with the projected feature point being the center are chosen, and the projected feature point is then matched against the candidate ORB feature descriptors. In a case that matching succeeds, it is considered that a target feature point matching the initial feature point is found.

Optionally, the first range is a rectangular frame or a rectangular frame. The form of the first range is not limited in this embodiment of this application. The first range may be alternatively a rhombic frame, a parallelogrammatic frame, a circular frame, among other forms.

Step 506e: Search a second range with the projected feature point being the center again for the target feature point matching the initial feature point in a case that a quantity of found target feature points is less than a preset threshold.

Optionally, the second range is larger than the first range.

Each projected feature point corresponds to a respective initial feature point, and each target feature point corresponds to a respective initial feature point. However, a total quantity of the projected feature points is less than or equal to a total quantity of the initial feature points, and a total quantity of the target feature points is less than or equal to the total quantity of the initial feature points.

In conclusion, by means of the repositioning method provided in this embodiment, a reference pose change amount that is acquired by using an IMU and has a particular error is used to project an initial feature point onto a current image through rotation and translation, to obtain a projected feature point; and matching is performed within a relatively small range according to the projected feature point to obtain a target feature point. In one aspect, because a search range is reduced, a quantity of candidate ORB feature descriptors of each initial feature point is reduced, so that a quantity of times of matching calculation that needs to be performed is reduced, and a matching process is accelerated. In another aspect, because the projected feature point is obtained based on a 2D-3D-2D conversion process, it is equivalent to that a 3D constraint condition is added, so that some interfering matching points that have high feature matching degree but do not satisfy geometric consistency can be filtered out.

Repositioning Calculation Process

In the optional embodiment shown in FIG. 5, for the process of calculating a pose change amount of a camera pose shown in step 508, after obtaining a plurality of target feature points of the current image relative to the first anchor image, the device inputs the initial feature point and the target feature point into a RANSAC algorithm, to calculate a homography matrix of the current image relative to the first anchor image. A decomposition algorithm in an IMU may decompose the homography matrix to obtain a rotation matrix $R_{relocalize}$ and a translation vector $T_{relocalize}$.

Figure 9:
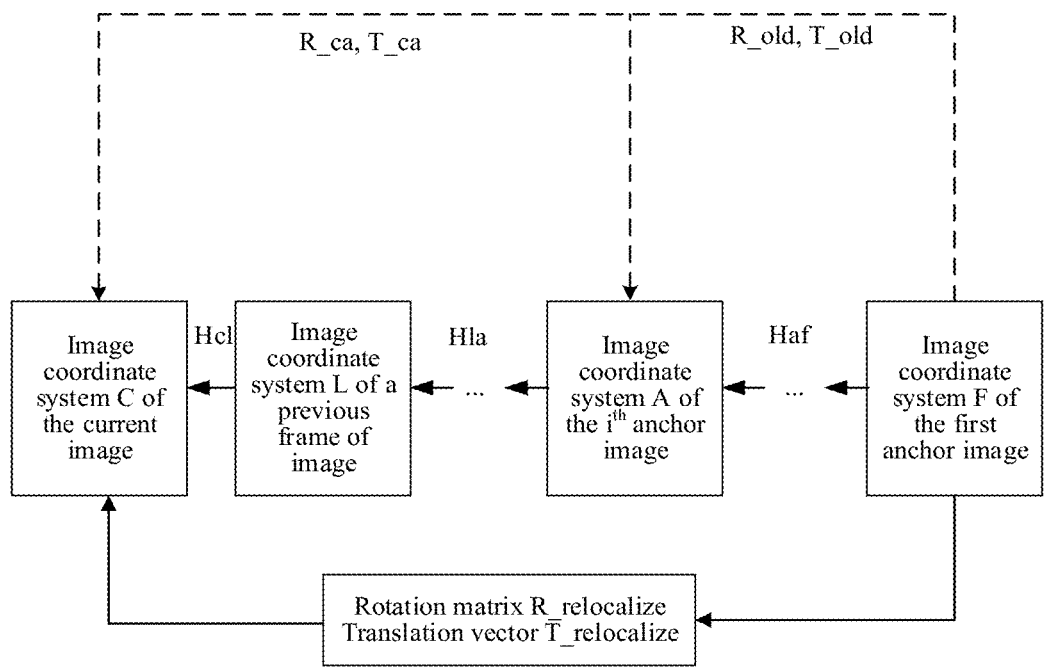
FIG. 9 is a schematic diagram of the principle of a repositioning method according to an exemplary embodiment of this application.

Errors in a case that repositioning is not performed and in a case that repositioning is performed are compared below:

1. Scenario in which repositioning is not performed:

As shown in FIG. 9, it is assumed that an image coordinate system of the first anchor image is F, an image coordinate system of the $i^{th}$ anchor image is A, an image coordinate system of a previous frame of image is L, and an image coordinate system of the current image is C. In a case that a tracking process is relatively smooth, a homography matrix between the first anchor image and the $i^{th}$ anchor image is $H_{af}$, and $H_{af}$ is decomposed to obtain a first rotation matrix R_old and a first translation vector T_old. A homography matrix between the $i^{th}$ anchor image and the previous frame of image is $H_{la}$, a homography matrix between the previous frame of image and the current image is $H_{cl}$, and $H_{la}$ and $H_{cl}$ are iteratively decomposed to obtain a second rotation matrix R_ca and a first translation vector T_ca.

That is, it is eventually obtained that a rotation matrix R and a displacement vector T of the current image relative to the first anchor image are as follows:

$$\begin{bmatrix} R & T \\ 0 & 1 \end{bmatrix} = \begin{bmatrix} R_{ca} & T_{ca} \\ 0 & 1 \end{bmatrix} * \begin{bmatrix} R_{old} & T_{old} \\ 0 & 1 \end{bmatrix}.$$

2. In a repositioning scenario, because repositioning is directly performed on the current image relative to the first anchor image, a continuously accumulated error in a plurality of anchor image tracking processes is eliminated, to directly obtain a result as follows:

$$\begin{bmatrix} R & T \\ 0 & 1 \end{bmatrix} = \begin{bmatrix} R_{celocalize} & T_{celocalize} \\ 0 & 1 \end{bmatrix}.$$

Because a point in a current image does not necessarily satisfy a planarity assumption, although a result obtained by directly decomposing a homography is prone to an assumption error, in an ideal case of anchor-SLAM, in a process of optical flow tracking from the first anchor image to the current image, there is no loss, no anchor image is switched, and no accumulated error such as a motion blur occurs. That is, a target matching point from the first anchor image to the current image is obtained, and a homography decomposition method is used to calculate a result. Therefore, the repositioning in this embodiment of this application can in practice eliminate an accumulated error, and a result is equivalent to an optimal case of anchor-SLAM.

Figure 10:
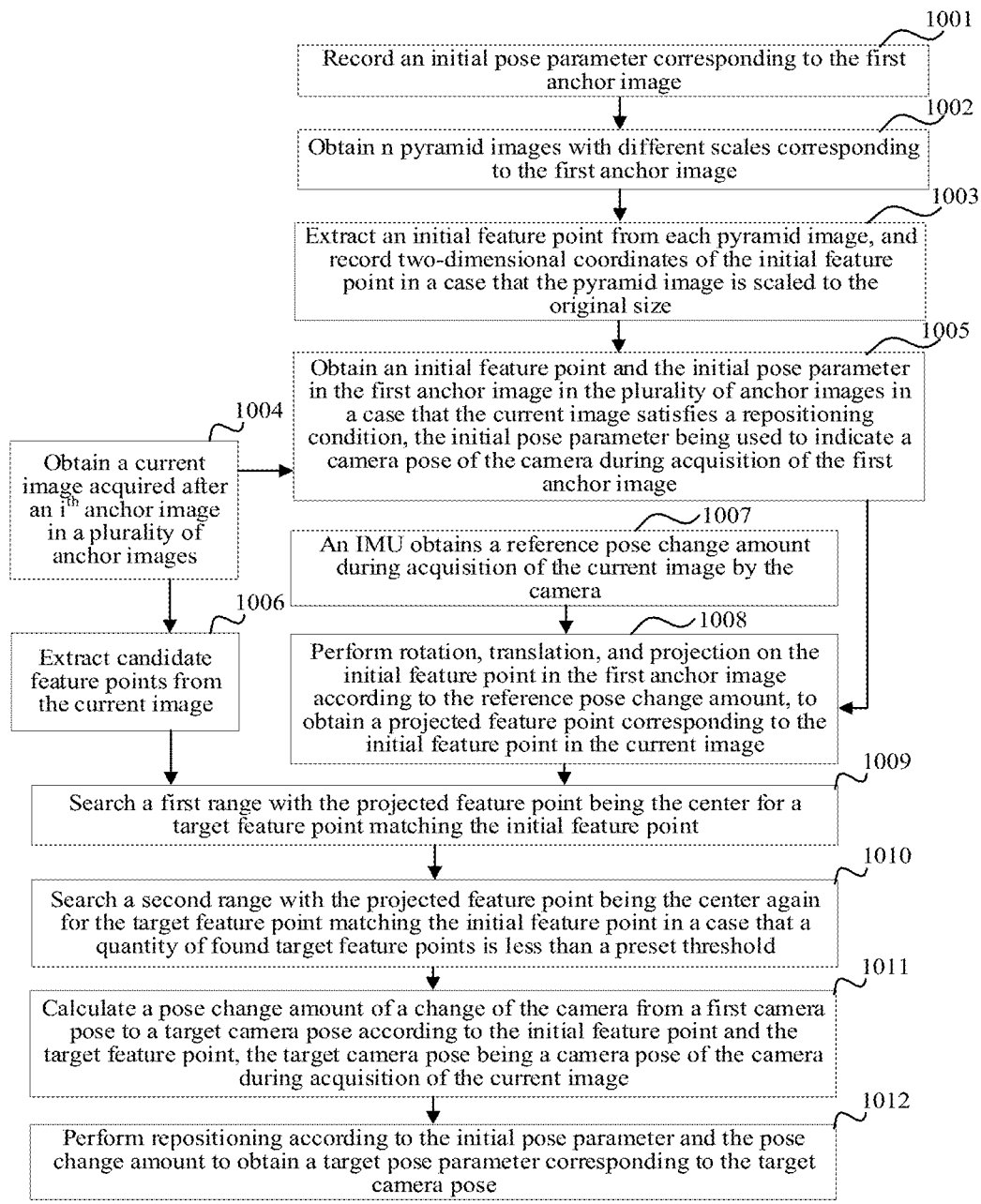
FIG. 10 is a flowchart of a repositioning method according to an exemplary embodiment of this application.

FIG. 10 is a flowchart of a repositioning method in a camera pose tracking process according to another exemplary embodiment of this application. This embodiment is described by using an example in which the method is applied to the device shown in FIG. 4. The method includes the following steps:

Step 1001: Record an initial pose parameter corresponding to the first anchor image.

An IMU is disposed in the device, and the IMU periodically acquires a pose parameter of a camera and a time stamp. The pose parameter includes a rotation matrix and a displacement vector, and the time stamp is used to represent an acquisition time of the pose parameter. Optionally, a rotation matrix acquired by the IMU is relatively accurate.

As soon as the camera in the device acquires each frame of image, a photographing time of the frame of image is simultaneously recorded. The device searches for and records the initial pose parameter of the camera during the photographing of the first anchor image according to a photographing time of the first anchor image.

Optionally, the first anchor image is the first frame of image acquired by the device, or, the first anchor image is a frame of image with a quantity of feature points being greater than a preset threshold in several first frames of image acquired by the device.

Step 1002: Obtain n pyramid images with different scales corresponding to the first anchor image, n being an integer greater than 1.

The device extracts an initial feature point from the first anchor image. In this embodiment, the device may extract an ORB feature point from the first anchor image as an initial feature point.

In an optional implementation, the device generates the n pyramid images with different scales for the first anchor image, n being a positive integer.

The pyramid image is an image obtained after the first anchor image is scaled according to a preset ratio. For example, the pyramid image includes four layers of image. The first anchor image is scaled according to scaling ratios 1.0, 0.8, 0.6, and 0.4, to obtain four images with different scales.

Step 1003: Extract an initial feature point from each pyramid image, and record two-dimensional coordinates of the initial feature point in a case that the pyramid image is scaled to the original size.

The device extracts a feature point from each layer of the pyramid image and calculates an ORB feature descriptor. For a feature point extracted from the pyramid image that is not in the original scale (1.0), after the pyramid image is scaled up to the original scale according to a scaling ratio, two-dimensional coordinates of each feature point in the pyramid image in the original scale are recorded. These feature points and two-dimensional coordinates in the pyramid image may be referred to as layer-key points. In an example, there are 500 at most feature points in each layer of the pyramid image.

For the first anchor image, a feature point in each pyramid image is determined as an initial feature point.

Step 1004: Obtain a current image acquired after an $i^{th}$ anchor image in a plurality of anchor images.

The camera in the device acquires frames of image at an interval of a preset time to form an image sequence. Optionally, the camera acquires frames of image at an interval of a preset time in a movement (translation and/or rotation) process to form an image sequence.

Optionally, the device determines the first frame of image in the image sequence (or one frame of image satisfying a predetermined condition in several frames of image in the front) as the first anchor image, performs feature point tracking on a subsequently acquired image relative to the first anchor image, and calculates a camera pose parameter of the camera according to a feature point tracking result. In a case that the effect of feature point tracking of a current frame of image is poorer than a preset condition, a previous frame of image of the current frame of image is determined as the second anchor image, feature point tracking is performed on a subsequently acquired image relative to the second anchor image, and the camera pose parameter of the camera is calculated according to a feature point tracking result. The rest is deduced by analogy. The device may sequentially perform camera pose tracking on a plurality of consecutive anchor images.

During an $i^{th}$ tracking process corresponding to the $i^{th}$ anchor image, the camera acquires a current image. The current image is a frame of image acquired after the $i^{th}$ anchor image, i being an integer greater than 1.

Step 1005. Obtain an initial feature point and the initial pose parameter in the first anchor image in the plurality of anchor images in a case that the current image satisfies a repositioning condition, the initial pose parameter being used to indicate a camera pose of the camera during acquisition of the first anchor image.

The device determines whether the current image satisfies the repositioning condition. The repositioning condition is used to indicate that a tracking process of the current image relative to the $i^{th}$ anchor image fails, or, the repositioning condition is used to indicate that an accumulated error in historical tracking processes is already greater than the preset condition.

In an optional embodiment, the device tracks the current image relative to the $i^{th}$ anchor image, and determines that a tracking process of the current image relative to the $i^{th}$ anchor image fails, and the current image satisfies the repositioning condition in a case that a feature point matching the $i^{th}$ anchor image does not exist in the current image or a quantity of feature points in the current image that match the $i^{th}$ anchor image is less than a first quantity.

In another optional embodiment, the device determines that an accumulated error in historical tracking processes is already greater than the preset condition in a case that the device determines that a quantity of frames between the current image and an image in previous repositioning is greater than a second quantity, or the device determines that an accumulated error in historical tracking processes is already greater than the preset condition in a case that the device determines that a quantity of anchor images between the $i^{th}$ anchor image and the first anchor image is greater than a third quantity.

Specific condition content of the repositioning condition is not limited in this embodiment.

The device attempts to perform feature point tracking on the current image relative to the first anchor image in a case that the current image satisfies the repositioning condition. In this case, the device obtains a cached initial feature point and initial pose parameter in the first anchor image, the initial pose parameter being used to indicate the camera pose of the camera during acquisition of the first anchor image.

Step 1006: Extract candidate feature points from the current image.

A feature extraction algorithm used by the device to extract a feature point may be at least one of a FAST detection algorithm, a Shi-Tomasi corner detection algorithm, a Harris corner detection algorithm, a SIFT algorithm, and an ORB algorithm. This embodiment is described by using an example of using an ORB algorithm to extract an ORB feature descriptor from the current image as a candidate feature point.

Step 1007: The IMU obtains a reference pose change amount during acquisition of the current image by the camera.

The IMU is disposed in the device, and the IMU can obtain the reference pose change amount during acquisition of the current image by the camera. The reference pose change amount is used to represent a pose change amount of the camera in a process from acquisition of the first anchor image to acquisition of the current image. The pose change amount includes a rotation matrix and a displacement vector. Because of physical features of the IMU, a rotation matrix acquired by the IMU is relatively accurate, and the displacement vector acquired by the IMU has a particular accumulated error but still approximates to an actual result to be still significant.

Step 1008: Perform rotation, translation, and projection on the initial feature point in the first anchor image according to the reference pose change amount, to obtain a projected feature point corresponding to the initial feature point in the current image.

In an exemplary example, this step includes the following sub-steps:

1: Obtain two-dimensional coordinates of the initial feature point in the first anchor image.

The device extracts and caches the two-dimensional coordinates of the initial feature point in the first anchor image in advance. The two-dimensional coordinates are homogeneously represented.

2. Perform back projection on the two-dimensional coordinates of the initial feature point, to obtain first three-dimensional coordinates $X_{born}$ of the initial feature point in the three-dimensional space.

The device converts the two-dimensional coordinates of the initial feature point into three-dimensional space by using the following formula, to obtain the first three-dimensional coordinates $X_{born}$ of the initial feature point in the three-dimensional space.

$$X_{born} = d * \begin{bmatrix} \frac{1}{f_x} & 0 & -\frac{c_x}{f_x} \\ 0 & \frac{1}{f_y} & -\frac{c_y}{f_y} \\ 0 & 0 & 1 \end{bmatrix} * x_{born} X_{born} = d * \begin{bmatrix} \frac{1}{f_x} & 0 & -\frac{c_x}{f_x} \\ 0 & \frac{1}{f_y} & -\frac{c_y}{f_y} \\ 0 & 0 & 1 \end{bmatrix} * x_{born},$$

where $f_x$, $f_y$, $c_x$, and $c_y$ are built-in parameters of the camera. The two-dimensional coordinates $X_{born}$ of the initial feature point are a homogeneous representation of layer-key points in the first anchor image, and the three-dimensional point $X_{born}$ is a non-homogeneous representation. It is assumed that an initial depth d of the first anchor image is 1.

3. Perform three-dimensional rotation and translation on the first three-dimensional coordinates $X_{born}$ by using the following formula, to obtain second three-dimensional coordinates $X_{current}$ corresponding to the initial feature point in the current image, $$X_{current}=R*X_{born}+T,$$

where R is the rotation matrix in the reference pose change amount acquired by the IMU, and T is the displacement vector in the reference pose change amount acquired by the IMU.

4. Project the second three-dimensional coordinates $X_{current}$ onto the current image, to obtain two-dimensional coordinates of the projected feature point in the current image.

The device projects the second three-dimensional coordinates $X_{current}$ onto the current image by using the following formula, to obtain two-dimensional coordinates $x_{current}$ of the projected feature point in the current image:

$$x_{current} = \begin{bmatrix} fx & 0 & cx \\ 0 & fy & cy \\ 0 & 0 & 1 \end{bmatrix} * X_{current},$$

where $f_x$, $f_y$, $c_x$, and $c_y$ are built-in parameters of the camera.

The positions of these projected feature points in the current image are used to predict the position of a target feature point. The positions of these projected feature points are usually the same as or close to the position of the target feature point.

Step 1009: Search a first range with the projected feature point being the center for a target feature point matching the initial feature point.

The device extracts a plurality of ORB feature descriptors from the current image. For a projected feature point corresponding to each initial feature point, candidate ORB feature descriptors located in the first range with the projected feature point being the center are chosen, and the projected feature point is then matched against the candidate ORB feature descriptors. In a case that matching succeeds, it is considered that a target feature point matching the initial feature point is found.

Optionally, the first range is a rectangular frame or a rectangular frame. The form of the first range is not limited in this embodiment of this application. The first range may be alternatively a rhombic frame, a parallelogrammatic frame, a circular frame, among another forms.

Step 1010: Search a second range with the projected feature point being the center again for the target feature point matching the initial feature point in a case that a quantity of found target feature points is less than a preset threshold.

Optionally, the second range is larger than the first range.

Each projected feature point corresponds to a respective initial feature point, and each target feature point corresponds to a respective initial feature point. However, a total quantity of the projected feature points is less than or equal to a total quantity of the initial feature points, and a total quantity of the target feature points is less than or equal to a total quantity of the initial feature points.

Step 1011: Calculate a pose change amount of the camera from a first camera pose to a target camera pose according to the initial feature point and the target feature point, the target camera pose being a camera pose of the camera during acquisition of the current image.

Optionally, the device calculates a homography matrix between two frames of image according to the initial feature point and the target feature point; and decomposes the homography matrix to obtain the pose change amount including $R_{relocalize}$ and $T_{relocalize}$ of the change of the camera from the first camera pose to the target camera pose.

The homography matrix describes a mapping relationship between two planes. The homography matrix may be used to perform movement estimation in a case that feature points in the natural scenario (the real environment) all fall in a same physical plane. The device uses RANSAC to decompose the homography matrix in a case that there are at least four pairs of matching initial feature points and target feature points, to obtain a rotation matrix $R_{relocalize}$ and a translation vector $T_{relocalize}$.

$R_{relocalize}$ is the rotation matrix of the change of the camera from the first camera pose to the target camera pose, and $T_{relocalize}$ is a displacement vector of the change of the camera from the first camera pose to the target camera pose.

Step 1012: Perform repositioning according to the initial pose parameter and the pose change amount to obtain a target pose parameter corresponding to the target camera pose.

After performing conversion on the initial pose parameter by using the pose change amount, the device performs repositioning to obtain the target pose parameter corresponding to the target camera pose, so as to calculate the camera pose of the camera during acquisition of the current image.

The terminal determines the current image as an $(i+1)^{th}$ anchor image in a case that repositioning of the current image succeeds.

The terminal continues to perform feature point tracking based on the $(i+1)^{th}$ anchor image. The terminal may further continue to generate an $(i+2)^{th}$ anchor image, an $(i+3)^{th}$ anchor image, an $(i+4)^{th}$ anchor image, and the like according to subsequent feature point tracking. The rest is deduced by analogy. Details are not described herein again. For a related process, reference may be made to the foregoing tracking content shown in FIG. 3.

In conclusion, by means of the repositioning method provided in this embodiment, repositioning is performed on a current image and the first anchor image in a case that the current image satisfies a repositioning condition, repositioning can be implemented in an anchor-SLAM algorithm for tracking a plurality of consecutive anchor images, and a tracking process is less prone to interruption, thereby resolving a problem that an SLAM repositioning method in the related art has a relatively poor repositioning effect in the field of AR.

In addition, because repositioning is performed on the current image relative to the first anchor image in a repositioning process, it may be considered that the first anchor image has no accumulated error. Therefore, in this embodiment, an accumulated error generated in a tracking process of a plurality of anchor images can further be eliminated.

By means of the repositioning method provided in this embodiment, a reference pose change amount that is acquired by using an IMU and has a particular error is used to project an initial feature point onto a current image through rotation and translation, to obtain a projected feature point; and matching is performed within a relatively small range according to the projected feature point to obtain a target feature point. In one aspect, because a search range is reduced, a quantity of candidate ORB feature descriptors of each initial feature point is reduced, so that a quantity of times of matching calculation that needs to be performed is reduced, and a matching process is accelerated. In another aspect, because the projected feature point is obtained based on a 2D-3D-2D conversion process, it is equivalent to that a 3D constraint condition is added, so that some interfering matching points that have high feature matching degree but do not satisfy geometric consistency can be filtered out.

In a schematic example, the foregoing repositioning method in a camera pose tracking process may be used in an AR program. By means of the repositioning method, a pose of a camera on a terminal can be tracked in real time according to scene information in the real world, and a display position of an AR element in an AR application is adjusted and changed according to a tracking result. An AR program run on the mobile phone in FIG. 1 or FIG. 2 is used as an example. In a case that a still cartoon character standing on a book needs to be displayed, no matter how a user moves the mobile phone, it is only necessary to change a display position of the cartoon character according to a pose change of a camera on the mobile phone, so that the standing position of the cartoon character on the book can be kept unchanged.

The following provides apparatus embodiments of this application. For technical details that are not specifically described in the apparatus embodiments, reference may be made to corresponding descriptions in the foregoing method embodiments.

Figure 11:
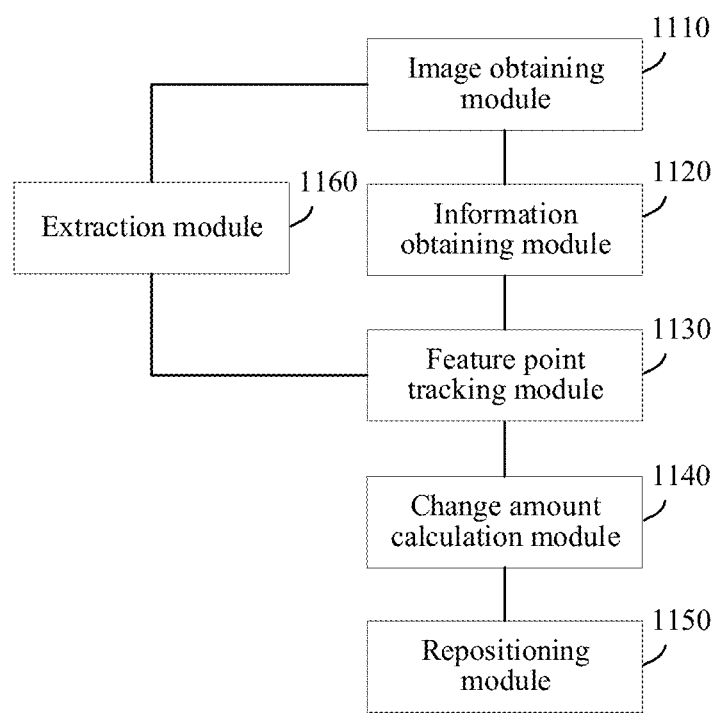
FIG. 11 is a block diagram of a repositioning apparatus in a camera pose tracking process according to an exemplary embodiment of this application.

FIG. 11 is a block diagram of a repositioning apparatus in a camera pose tracking process according to an exemplary embodiment of this application. The repositioning apparatus may be implemented by software, hardware or a combination of software and hardware as an entire electronic device or mobile terminal or a part of the electronic device or mobile terminal. The apparatus is provided with a camera. The camera may be a monocular camera. The apparatus includes an image obtaining module 1110, an information obtaining module 1120, a feature point tracking module 1130, a change amount calculation module 1140, and a repositioning module 1150.

The image obtaining module 1110 is configured to obtain a current image acquired after an $i^{th}$ anchor image in a plurality of anchor images, i being an integer greater than 1.

The information obtaining module 1120 is configured to obtain an initial feature point and an initial pose parameter in the first anchor image in the plurality of anchor images in a case that the current image satisfies a repositioning condition, the initial pose parameter being used to indicate a camera pose of the camera during acquisition of the first anchor image;

The feature point tracking module 1130 is configured to perform feature point tracking on the current image relative to the first anchor image, to obtain a target feature point matching the initial feature point.

The change amount calculation module 1140 is configured to calculate a pose change amount of the camera from a first camera pose to a target camera pose according to the initial feature point and the target feature point, the target camera pose being a camera pose of the camera during acquisition of the current image.

The repositioning module 1150 is configured to perform repositioning according to the initial pose parameter and the pose change amount to obtain a target pose parameter corresponding to the target camera pose.

In an optional embodiment, the device is further provided with an IMU, and the feature point tracking module 1130 includes:

an extraction submodule, configured to extract candidate feature points from the current image;

an acquisition submodule, configured to obtain a reference pose change amount of the camera during acquisition of the current image by using the IMU;

a projection submodule, configured to perform rotation, translation, and projection on the initial feature point in the first anchor image according to the reference pose change amount, to obtain a projected feature point corresponding to the initial feature point in the current image; and a search submodule, configured to search candidate feature points in a first range with the projected feature point being the center for a target feature point matching the initial feature point.

In an optional embodiment, the projection submodule is configured to:

obtain two-dimensional coordinates of the initial feature point in the first anchor image;

perform back projection on the two-dimensional coordinates of the initial feature point, to obtain first three-dimensional coordinates $X_{born}$ of the initial feature point in the three-dimensional space;

perform three-dimensional rotation and translation on the first three-dimensional coordinates $X_{born}$ by using the following formula, to obtain second three-dimensional coordinates $X_{current}$ corresponding to the initial feature point in the current image, $$X_{current} = R * X_{born} + T,$$

project the second three-dimensional coordinates $X_{current}$ onto the current image, to obtain two-dimensional coordinates of the projected feature point in the current image, R being a rotation matrix in the reference pose change amount, and T being a displacement vector in the reference pose change amount.

In an optional embodiment, the search submodule is further configured to search a second range with the projected feature point being the center again for the target feature point matching the initial feature point in a case that a quantity of the found target feature points is less than a preset threshold, the second range being larger than the first range.

In an optional embodiment, the apparatus further includes an extraction module 1160.

The image obtaining module 1110 is further configured to obtain n pyramid images with different scales corresponding to the first anchor image, n being an integer greater than 1.

The extraction module 1160 is further configured to: extract an initial feature point from each pyramid image, and record two-dimensional coordinates of the initial feature point in a case that the pyramid image is scaled to the original size.

In an optional embodiment, the change amount calculation module 1140 is configured to: calculate a homography matrix of the camera in a camera pose change process according to the initial feature point and the target feature point; and decompose the homography matrix, to obtain the pose change amount including $R_{relocalize}$ and $T_{relocalize}$ of the change of the camera from the first camera pose to the target camera pose.

In an optional embodiment, the feature point tracking module 1130 is configured to determine the current image as an $(i+1)^{th}$ anchor image, and perform feature point tracking on a subsequently acquired image relative to the $(i+1)^{th}$ anchor image. That is, the feature point tracking module 1130 is configured to continue to perform feature point tracking based on the $(i+1)^{th}$ anchor image in a case that the current image is determined as the $(i+1)^{th}$ anchor image.

In a case that the repositioning apparatus in a camera pose tracking process provided in the foregoing embodiments implements repositioning, only divisions of the foregoing functional modules are described by using an example. During actual application, the foregoing functions may be allocated to and completed by different functional modules according to requirements, that is, the internal structure of the device is divided into different functional modules, to complete all or some of the foregoing described functions. In addition, the repositioning apparatus provided in the foregoing embodiments belongs to the same concept as the embodiments of the repositioning method. For a specific implementation process of the repositioning apparatus, refer to the method embodiments for details. Details are not described herein again.

Figure 12:
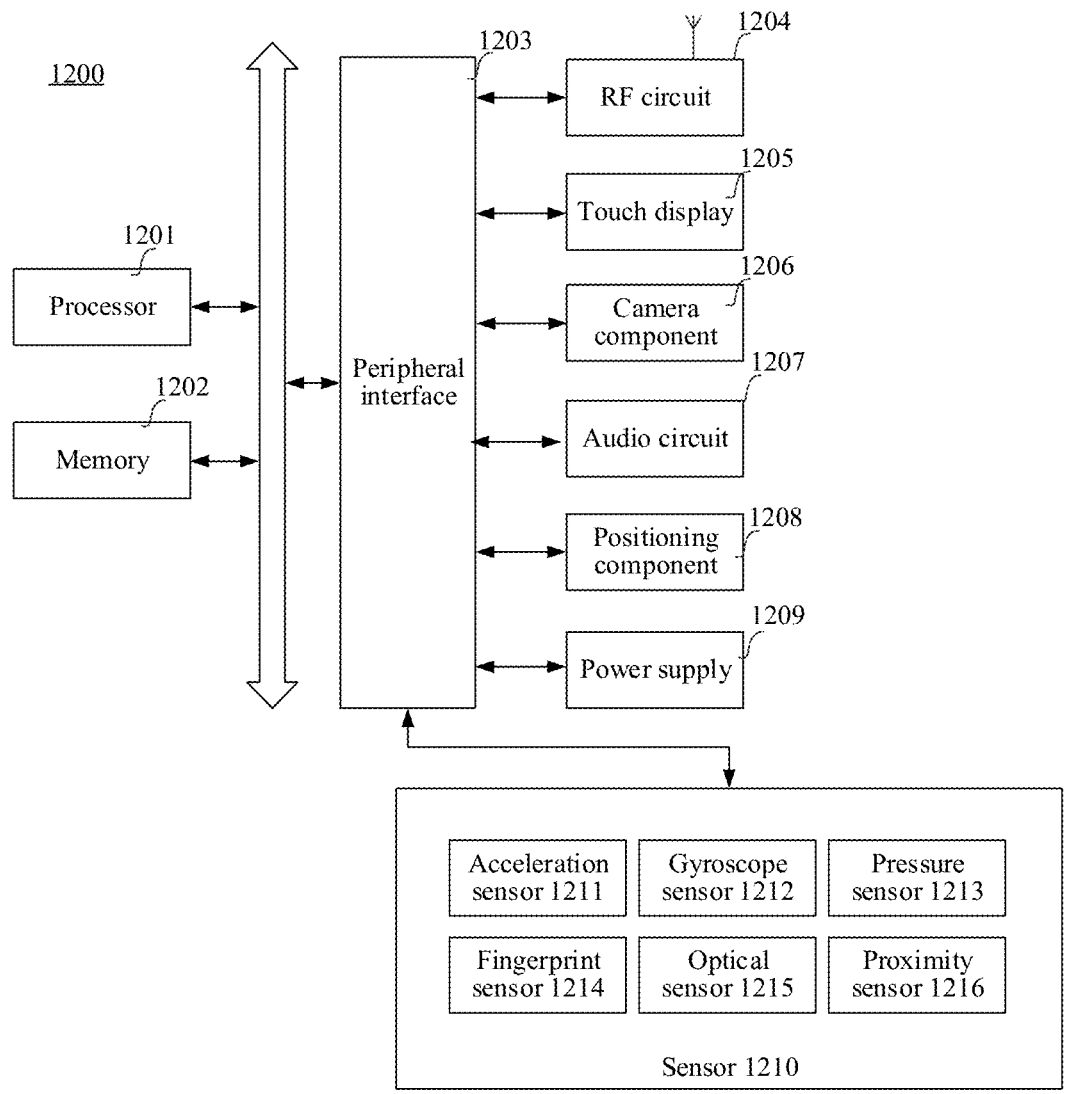
FIG. 12 is a block diagram of an electronic device according to an exemplary embodiment of this application.

FIG. 12 is a structural block diagram of an electronic device 1200 according to an exemplary embodiment of this application. The electronic device 1200 may be a smart phone, a tablet computer, a Moving Picture Experts Group Audio Layer III (MP3) player, a Moving Picture Experts Group Audio Layer IV (MP4) player, a laptop computer or a desktop computer. The electronic device 1200 may also be referred to as a user terminal, a portable electronic device, a laptop device, a desktop device, among other names.

Generally, the electronic device 1200 includes a processor 1201 and a memory 1202.

The processor 1201 may include one or more processing cores, for example, a 4-core processor, an 8-core processor, and the like. The processor 1201 may be implemented in at least one hardware form of a digital signal processor (DSP), a field-programmable gate array (FPGA), and a programmable logic array (PLA). The processor 1201 may also include a main processor and a co-processor. The main processor is a processor configured to process data in a wake-up state or is referred to as a central processing unit (CPU). The co-processor is a low power consumption processor configured to process data in a standby state. In some embodiments, the processor 1201 may be integrated with a graphics processing unit (GPU). The GPU is configured to render and draw content that needs to be displayed on a display. In some embodiments, the processor 1201 may further include an artificial intelligence (AI) processor. The AI processor is configured to process a computing operation related to machine learning.

The memory 1202 may include one or more computer-readable storage media. The computer-readable storage medium may be non-transient. The memory 1202 may further include a high-speed random access memory (RAM) and a non-volatile memory such as one or more magnetic disk storage devices or flash memory storage devices. In some embodiments, the non-transient computer-readable storage medium in the memory 1202 is configured to store at least one instruction. The at least one instruction is executed by the processor 1201 to implement the repositioning method in a camera pose tracking process provided in the method embodiments of this application.

In some embodiments, the electronic device 1200 further optionally includes a peripheral interface 1203 and at least one peripheral. The processor 1201, the memory 1202, and the peripheral interface 1203 may be connected by a bus or a signal line. Peripherals may be connected to the peripheral interface 1203 by a bus, a signal line or a circuit board. Schematically, the peripheral includes at least one of a radio frequency (RF) circuit 1204, a touch display 1205, a camera component 1206, an audio circuit 1207, a positioning component 1208, and a power supply 1209.

The peripheral interface 1203 may be configured to connect at least one peripheral related to an input/output (I/O) to the processor 1201 and the memory 1202. In some embodiments, the processor 1201, the memory 1202, and the peripheral interface 1203 are integrated in one same chip or circuit board. In some other embodiments, any one or two of the processor 1201, the memory 1202, and the peripheral interface 1203 may be separately implemented on a chip or circuit board. This is not limited in this embodiment.

The RF circuit 1204 is configured to receive and transmit an RF signal, which is also referred to as electromagnetic signal. The RF circuit 1204 communicates with a communications network and another communication device by using an electromagnetic signal. The RF circuit 1204 converts an electrical signal into an electromagnetic signal for transmission, or, converts a received electromagnetic signal into an electrical signal. Optionally. The RF circuit 1204 includes an antenna system, an RF transceiver, one or more amplifiers, a tuner, an oscillator, a DSP, a CODEC chip set, a subscriber identity module card, and the like. The RF circuit 1204 may communicate with another electronic device by using at least one wireless communication protocol. The wireless communication protocol includes, but is not limited to, a World Wide Web, a metropolitan area network, an intranet, various generations of mobile communications networks (2G, 3G, 4G, and 5G), a wireless local area network and/or a Wireless Fidelity (Wi-Fi) network. In some embodiments. The RF circuit 1204 may further include a Near Field Communication (NFC)-related circuit. This is not limited in this application.

The display 1205 is configured to display a user interface (UI). The UI may include a graphic, a text, an icon, a video, and any combination thereof. In a case that the display 1205 is a touch display, the display 1205 further has a capability of acquiring a touch signal on or above the surface of the display 1205. The touch signal may be input as a control signal into the processor 1201 for processing. In this case, the display 1205 may further be configured to provide a virtual button and/or a virtual keyboard, which is also referred to as a soft button and/or a soft keyboard. In some embodiments, there may be one display 1205, disposed on a front panel of the electronic device 1200. In some other embodiments, there may be at least two displays 1205, respectively disposed on different surfaces of the electronic device 1200 or designed to be foldable. In some other embodiments, the display 1205 may be a flexible display, disposed on a curved surface or folded surface of the electronic device 1200. Even, the display 1205 may further be disposed to be a non-rectangular irregular graphic, that is, an irregular-shaped screen. The display 1205 may be manufactured by using a material such as a liquid crystal display (LCD) or an organic light-emitting diode (OLED).

The camera component 1206 is configured to acquire an image or a video. Optionally, the camera component 1206 includes a front-facing camera and a rear-facing camera. Generally, the front-facing camera is disposed on the front panel of the electronic device, and the rear-facing camera is disposed on the back surface of the electronic device. In some embodiments, there are at least two rear-facing cameras, which are respectively any one of a main camera, a depth-of-field camera, a wide-angle camera, a long-focus camera, to implement the integration of the main camera and the depth-of-field camera to implement a background blurring function, the integration of the main camera and the wide-angle camera to implement panoramic photography and a virtual reality (VR) photographing function or another integrated photographing function. In some embodiments, the camera component 1206 may further include a flash. The flash may be a mono color temperature flash or may be a dual color temperature flash. The dual color temperature flash is a combination of a warm light flash and a cold light flash and may be used for light compensation at different color temperatures.

The audio circuit 1207 may include a microphone and a loudspeaker. The microphone is configured to acquire sound waves from a user and an environment and convert the sound waves into electrical signals for input into the processor 1201 for processing or input into the RF circuit 1204 to implement voice communication. For stereo acquisition or noise reduction, there may be a plurality of microphones, respectively disposed at different positions of the electronic device 1200. The microphone may be alternatively a microphone array or an omnidirectional microphone. The loudspeaker is configured to convert an electrical signal from the processor 1201 or the RF circuit 1204 into a sound wave. The loudspeaker may be a conventional diaphragm loudspeaker or may be a piezoelectric ceramic loudspeaker. In a case that the loudspeaker is a piezoelectric ceramic loudspeaker, an electrical signal can be converted into a sound wave audible to humans, and an electrical signal can be converted into a sound wave inaudible to humans for uses such as ranging. In some embodiments, the audio circuit 1207 may further include an earphone jack.

The positioning component 1208 is configured to locate a current geographical position of the electronic device 1200, to implement navigation or a location-based service (LBS). The positioning component 1208 may be a positioning component based on the US' global positioning system (GPS), China's BeiDou system, Russia's GLONASS, and Europe's Galileo system.

The power supply 1209 is configured to supply power to various components in the electronic device 1200. The power supply 1209 may be alternating-current (AC) power, direct-current (AC) power, a disposable battery or a rechargeable battery. In a case that the power supply 1209 includes a rechargeable battery, the rechargeable battery may be a wired charging battery or a wireless charging battery. The wired charging battery is a battery charged by using a wired circuit, and the wireless charging battery is a battery charged by using a wireless coil. The rechargeable battery may be alternatively used to support a fast charging technology.

In some embodiments, the electronic device 1200 further includes one or more sensors 1210. The one or more sensors 1210 include, but are not limited to, an acceleration sensor 1211, a gyroscope sensor 1212, a pressure sensor 1213, a fingerprint sensor 1214, an optical sensor 1215, and a proximity sensor 1216.

The acceleration sensor 1211 may detect accelerations on three coordinate axes of a coordinate system established by the electronic device 1200. For example, the acceleration sensor 1211 may be configured to detect the components of the gravitational acceleration on the three coordinate axes. The processor 1201 may control the touch display 1205 according to a gravitational acceleration signal acquired by the acceleration sensor 1211 to display a user interface in a landscape view or a portrait view. The acceleration sensor 1211 may further be configured to acquire game data or movement data of a user.

The gyroscope sensor 1212 may detect a body direction and a rotational angle of the electronic device 1200, and the gyroscope sensor 1212 may coordinate with the acceleration sensor 1211 to acquire a 3D motion of a user on the electronic device 1200. The processor 1201 may implement the following functions according to data acquired by the gyroscope sensor 1212: motion sensing (for example, a UI is changed according to a tilt operation of a user), image stabilization during photographing, game control, and inertial navigation.

The pressure sensor 1213 may be disposed at a side frame of the electronic device 1200 and/or at an underlying layer of the touch display 1205. In a case that the pressure sensor 1213 is disposed at a side frame of the electronic device 1200, a holding signal of the electronic device 1200 by a user may be detected, and the processor 1201 performs left/right hand recognition or fast operation according to the holding signal acquired by the pressure sensor 1213. In a case that the pressure sensor 1213 is disposed at an underlying layer of the touch display 1205, and the processor 1201 controls an operable control on the UI according to a pressure operation on the touch display 1205 by the user. The operable control includes at least one of a button control, a scroll bar control, an icon control, and a menu control.

The fingerprint sensor 1214 is configured to acquire a fingerprint of a user, and the processor 1201 recognizes the identity of the user according to the fingerprint acquired by the fingerprint sensor 1214, or, the fingerprint sensor 1214 recognizes the identity of the user according to the acquired fingerprint. In a case that it is recognized that the identity of the user is a trusted identity, the processor 1201 authorizes the user to perform a related sensitive operation. The sensitive operation includes unlocking a screen, viewing encrypted information, downloading software, making a payment, changing a setting, and the like. The fingerprint sensor 1214 may be disposed on a front surface, a rear surface or a side surface of the electronic device 1200. In a case that the electronic device 1200 is provided with a physical button or a manufacturer logo, the fingerprint sensor 1214 may be integrated with the physical button or manufacturer logo.

The optical sensor 1215 is configured to acquire environmental light intensity. In an embodiment, the processor 1201 may control the display brightness of the touch display 1205 according to the environmental light intensity acquired by the optical sensor 1215. Schematically, the display brightness of the touch display 1205 is increased in a case that the environmental light intensity is relatively high. The display brightness of the touch display 1205 is reduced in a case that environmental light intensity is relatively low. In another embodiment, the processor 1201 may further dynamically adjust a photographing parameter of the camera component 1206 according to the environmental light intensity acquired by the optical sensor 1215.

The proximity sensor 1216 is also referred to as a distance sensor and is usually disposed on the front panel of the electronic device 1200. The proximity sensor 1216 is configured to acquire a distance between a user and the front surface of the electronic device 1200. In an embodiment, in a case that the proximity sensor 1216 detects that the distance between the user and the front surface of the electronic device 1200 gradually decreases, the processor 1201 controls the touch display 1205 to switch from a screen-on state to a screen-off state. In a case that the proximity sensor 1216 detects that the distance between the user and the front surface of the electronic device 1200 gradually increases, the processor 1201 controls the touch display 1205 to switch from the screen-off state to the screen-on state.

A person skilled in the art may understand that, the structure shown in FIG. 12 does not constitute a limitation to the electronic device 1200. More or fewer components than those shown in the figure may be included, or some component may be combined, or different component arrangements may be used.

The sequence numbers of the foregoing embodiments of this application are merely for description purpose and do not indicate the preference of the embodiments.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a read-only memory (ROM), a magnetic disk, an optical disc, or the like.

The foregoing descriptions are merely preferred embodiments of this application, but are not intended to limit this application. Any modification, equivalent replacement, or improvement made within the spirit and principle of this application shall fall within the protection scope of this application.

What is claimed is:

1. A repositioning method in a camera pose tracking process, applied to an electronic device having a camera, the electronic device being configured to sequentially perform camera pose tracking on a plurality of anchor images, the method comprising:
    obtaining a current image acquired by the camera after an $i^{th}$ anchor image in the plurality of anchor images, i being an integer greater than 1;
    obtaining an initial feature point and an initial pose parameter in a first anchor image in the plurality of anchor images in a case that the current image satisfies a repositioning condition, the initial pose parameter being used to indicate a camera pose of the camera during acquisition of the first anchor image;
    performing feature point tracking on the current image relative to the first anchor image, to obtain a target feature point matching the initial feature point;
    calculating a pose change amount of the camera from a first camera pose to a target camera pose according to the initial feature point and the target feature point, the target camera pose being a camera pose of the camera during acquisition of the current image; and
    performing repositioning according to the initial pose parameter and the pose change amount to obtain a target pose parameter corresponding to the target camera pose.

2. The method according to claim 1, wherein the electronic device is further provided with an inertial measurement unit (IMU); and
    the performing feature point tracking on the current image relative to the first anchor image, to obtain a target feature point matching the initial feature point comprises:
    extracting candidate feature points from the current image;
    obtaining a reference pose change amount of the camera during acquisition of the current image by using the IMU;
    performing rotation, translation, and projection on the initial feature point in the first anchor image according to the reference pose change amount, to obtain a projected feature point corresponding to the initial feature point in the current image; and
    searching the candidate feature points in a first range with the projected feature point being the center for a target feature point matching the initial feature point.

3. The method according to claim 2, wherein the performing rotation, translation, and projection on the initial feature point in the first anchor image according to the reference pose change amount, to obtain a projected feature point corresponding to the initial feature point in the current image comprises:
    obtaining two-dimensional coordinates of the initial feature point in the first anchor image;
    performing back projection on the two-dimensional coordinates of the initial feature point, to obtain first three-dimensional coordinates $X_{born}$ of the initial feature point in the three-dimensional space;
    performing three-dimensional rotation and translation on the first three-dimensional coordinates $X_{born}$ by using the following formula, to obtain second three-dimensional coordinates $X_{current}$ corresponding to the initial feature point in the current image, $$X_{current} = R*X_{born} + T; \text{ and}$$

projecting the second three-dimensional coordinates $X_{current}$ projection to the current image, to obtain two-dimensional coordinates of the projected feature point in the current image,
    R being a rotation matrix in the reference pose change amount, and T being a displacement vector in the reference pose change amount.

4. The method according to claim 2, wherein after the searching a first range with the projected feature point being the center for a target feature point matching the initial feature point, the method further comprises:
    searching a second range with the projected feature point being the center again for the target feature point matching the initial feature point in a case that a quantity of the found target feature points is less than a preset threshold,
    the second range being larger than the first range.

5. The method according to claim 1, further comprising:
    obtaining n pyramid images with different scales corresponding to the first anchor image, n being an integer greater than 1; and
    extracting an initial feature point from each pyramid image, and recording two-dimensional coordinates of the initial feature point in a case that the pyramid image is scaled to the original size.

6. The method according to claim 1, wherein the calculating a pose change amount of the camera from a first camera pose to a target camera pose according to the initial feature point and the target feature point comprises:
    calculating a homography matrix of the camera in a camera pose change process according to the initial feature point and the target feature point; and
    decomposing the homography matrix, to obtain the pose change amount comprising $R_{relocalize}$ and $T_{relocalize}$ of the change of the camera from the first camera pose to the target camera pose.

7. The method according to claim 1, wherein after the performing repositioning according to the initial pose parameter and the pose change amount to obtain a target pose parameter corresponding to the target camera pose, the method further comprises:
    determining the current image as an (i+1)th anchor image; and continuing to perform feature point tracking based on the (i+1)th anchor image.

8. An electronic device, comprising a memory and a processor, a camera, and a plurality of programs stored in the memory, wherein the plurality of programs, when executed by the processor, cause the electronic device to sequentially perform a process of camera pose tracking on a plurality of anchor images, the process including:

obtaining a current image acquired by the camera after an $i^{th}$ anchor image in the plurality of anchor images, i being an integer greater than 1;

obtaining an initial feature point and an initial pose parameter in a first anchor image in the plurality of anchor images in a case that the current image satisfies a repositioning condition, the initial pose parameter being used to indicate a camera pose of the camera during acquisition of the first anchor image;

performing feature point tracking on the current image relative to the first anchor image, to obtain a target feature point matching the initial feature point;

calculating a pose change amount of the camera from a first camera pose to a target camera pose according to the initial feature point and the target feature point, the target camera pose being a camera pose of the camera during acquisition of the current image; and performing repositioning according to the initial pose parameter and the pose change amount to obtain a target pose parameter corresponding to the target camera pose.

9. The electronic device according to claim 8, wherein the electronic device is further provided with an inertial measurement unit (IMU); and the performing feature point tracking on the current image relative to the first anchor image, to obtain a target feature point matching the initial feature point comprises:

extracting candidate feature points from the current image;

obtaining a reference pose change amount of the camera during acquisition of the current image by using the IMU;

performing rotation, translation, and projection on the initial feature point in the first anchor image according to the reference pose change amount, to obtain a projected feature point corresponding to the initial feature point in the current image; and searching the candidate feature points in a first range with the projected feature point being the center for a target feature point matching the initial feature point.

10. The electronic device according to claim 9, wherein the performing rotation, translation, and projection on the initial feature point in the first anchor image according to the reference pose change amount, to obtain a projected feature point corresponding to the initial feature point in the current image comprises:

obtaining two-dimensional coordinates of the initial feature point in the first anchor image;

performing back projection on the two-dimensional coordinates of the initial feature point, to obtain first three-dimensional coordinates $X_{born}$ of the initial feature point in the three-dimensional space;

performing three-dimensional rotation and translation on the first three-dimensional coordinates $X_{born}$ by using the following formula, to obtain second three-dimensional coordinates $X_{current}$ corresponding to the initial feature point in the current image, $X_{current} = R*X_{born}+T$; and projecting the second three-dimensional coordinates $X_{current}$ projection to the current image, to obtain two-dimensional coordinates of the projected feature point in the current image, R being a rotation matrix in the reference pose change amount, and T being a displacement vector in the reference pose change amount.

11. The electronic device according to claim 9, wherein the process further comprises:

after searching a first range with the projected feature point being the center for a target feature point matching the initial feature point:

searching a second range with the projected feature point being the center again for the target feature point matching the initial feature point in a case that a quantity of the found target feature points is less than a preset threshold, the second range being larger than the first range.

12. The electronic device according to claim 8, wherein the process further comprises:

obtaining n pyramid images with different scales corresponding to the first anchor image, n being an integer greater than 1; and extracting an initial feature point from each pyramid image, and recording two-dimensional coordinates of the initial feature point in a case that the pyramid image is scaled to the original size.

13. The electronic device according to claim 8, wherein the calculating a pose change amount of the camera from a first camera pose to a target camera pose according to the initial feature point and the target feature point comprises:

calculating a homography matrix of the camera in a camera pose change process according to the initial feature point and the target feature point; and decomposing the homography matrix, to obtain the pose change amount comprising $R_{relocalize}$ and $T_{relocalize}$ of the change of the camera from the first camera pose to the target camera pose.

14. The electronic device according to claim 8, wherein the process further comprises:

after performing repositioning according to the initial pose parameter and the pose change amount to obtain the target pose parameter corresponding to the target camera pose:

determining the current image as an (i+1)th anchor image; and continuing to perform feature point tracking based on the (i+1)th anchor image.

15. A non-transitory computer-readable storage medium storing instructions, the instructions, when executed by a processor of an electronic device having a camera, cause the electronic device to sequentially perform a process of camera pose tracking on a plurality of anchor images, the process including:

obtaining a current image acquired by the camera after an $i^{th}$ anchor image in the plurality of anchor images, i being an integer greater than 1;

obtaining an initial feature point and an initial pose parameter in a first anchor image in the plurality of anchor images in a case that the current image satisfies a repositioning condition, the initial pose parameter being used to indicate a camera pose of the camera during acquisition of the first anchor image;

performing feature point tracking on the current image relative to the first anchor image, to obtain a target feature point matching the initial feature point;

calculating a pose change amount of the camera from a first camera pose to a target camera pose according to the initial feature point and the target feature point, the target camera pose being a camera pose of the camera during acquisition of the current image; and performing repositioning according to the initial pose parameter and the pose change amount to obtain a target pose parameter corresponding to the target camera pose.

16. The non-transitory computer-readable storage medium according to claim 15, wherein the electronic device is further provided with an inertial measurement unit (IMU); and the performing feature point tracking on the current image relative to the first anchor image, to obtain a target feature point matching the initial feature point comprises:

extracting candidate feature points from the current image;

obtaining a reference pose change amount of the camera during acquisition of the current image by using the IMU;

performing rotation, translation, and projection on the initial feature point in the first anchor image according to the reference pose change amount, to obtain a projected feature point corresponding to the initial feature point in the current image; and searching the candidate feature points in a first range with the projected feature point being the center for a target feature point matching the initial feature point.

17. The non-transitory computer-readable storage medium according to claim 16, wherein the performing rotation, translation, and projection on the initial feature point in the first anchor image according to the reference pose change amount, to obtain a projected feature point corresponding to the initial feature point in the current image comprises:

obtaining two-dimensional coordinates of the initial feature point in the first anchor image;

performing back projection on the two-dimensional coordinates of the initial feature point, to obtain first three-dimensional coordinates $X_{born}$ of the initial feature point in the three-dimensional space;

performing three-dimensional rotation and translation on the first three-dimensional coordinates $X_{born}$ by using the following formula, to obtain second three-dimensional coordinates $X_{current}$ corresponding to the initial feature point in the current image, $$X_{current} = R * X_{born} + T;\text{ and}$$

projecting the second three-dimensional coordinates $X_{current}$ projection to the current image, to obtain two-dimensional coordinates of the projected feature point in the current image, R being a rotation matrix in the reference pose change amount, and T being a displacement vector in the reference pose change amount.

18. The non-transitory computer-readable storage medium according to claim 16, wherein the process further comprises:

after searching the first range with the projected feature point being the center for the target feature point matching the initial feature point:

searching a second range with the projected feature point being the center again for the target feature point matching the initial feature point in a case that a quantity of the found target feature points is less than a preset threshold, the second range being larger than the first range.

19. The non-transitory computer-readable storage medium according to claim 15, wherein the process further comprises:

obtaining n pyramid images with different scales corresponding to the first anchor image, n being an integer greater than 1; and extracting an initial feature point from each pyramid image, and recording two-dimensional coordinates of the initial feature point in a case that the pyramid image is scaled to the original size.

20. The non-transitory computer-readable storage medium according to claim 15, wherein the calculating a pose change amount of the camera from a first camera pose to a target camera pose according to the initial feature point and the target feature point comprises:

calculating a homography matrix of the camera in a camera pose change process according to the initial feature point and the target feature point; and decomposing the homography matrix, to obtain the pose change amount comprising $R_{relocalize}$ and $T_{relocalize}$ of the change of the camera from the first camera pose to the target camera pose.

\* \* \* \* \*